(12) United States Patent
Baklund et al.

(10) Patent No.: US 10,836,085 B2
(45) Date of Patent: Nov. 17, 2020

(54) MICRO MOULDING MACHINE AND PROCESS

(71) Applicant: Minnesota Micro Molding, Machining & Manufacturing, Inc., Hutchinson, MN (US)

(72) Inventors: Jon Baklund, Hutchinson, MN (US); Alex Madsen, Dassel, MN (US)

(73) Assignee: Minnesota Micro Molding, Machining & Manufacturing, Inc., Hutchinson, MN (US)

( * ) Notice: Subject to any disclaimer, the term of this patent is extended or adjusted under 35 U.S.C. 154(b) by 246 days.

(21) Appl. No.: 16/100,265

(22) Filed: Aug. 10, 2018

(65) Prior Publication Data

US 2019/0193312 A1     Jun. 27, 2019

Related U.S. Application Data

(60) Provisional application No. 62/545,567, filed on Aug. 15, 2017.

(51) Int. Cl.
*B29C 45/02* (2006.01)
*B29C 45/53* (2006.01)
*B29C 45/18* (2006.01)
*B29C 45/00* (2006.01)
*B29C 45/74* (2006.01)
*B29L 31/00* (2006.01)

(52) U.S. Cl.
CPC ........ *B29C 45/021* (2013.01); *B29C 45/1808* (2013.01); *B29C 45/53* (2013.01); *B29C 45/531* (2013.01); *B29C 45/74* (2013.01); *B29C 2045/0091* (2013.01); *B29C 2045/0094* (2013.01); *B29L 2031/756* (2013.01)

(58) Field of Classification Search
None
See application file for complete search history.

(56) References Cited

U.S. PATENT DOCUMENTS

| | | | | |
|---|---|---|---|---|
| 4,065,108 A * | 12/1977 | Olmsted | ................. | B29C 45/52 366/76.1 |
| 4,389,358 A * | 6/1983 | Hendry | ............. | B29O 44/0492 264/250 |
| 5,258,147 A * | 11/1993 | Yokota | ................... | B29O 45/76 264/40.1 |
| 5,499,915 A * | 3/1996 | Fujita | ..................... | B29C 45/54 425/557 |
| 5,660,864 A * | 8/1997 | Schmidhalter | ....... | B29O 45/541 264/40.7 |
| 5,911,924 A * | 6/1999 | Siegrist | ............. | B29O 45/5008 264/328.1 |
| 5,983,976 A * | 11/1999 | Kono | ................... | B22D 17/007 164/113 |

(Continued)

*Primary Examiner* — Jacob T Minskey
*Assistant Examiner* — Baileigh Kate Darnell
(74) *Attorney, Agent, or Firm* — Tysver Beck Evans (57) ABSTRACT

A micro moulding machine and process for forming small plastic parts for the medical device industry. The machine adds heat in two steps to a precision sized plastic pellet and then displaces the entire pellet volume into the mould cavity. A substantial amount of heat is added to the pellet by forcing it through an orifice very near the gate of the mould. The pneumatic pressure to drive the pellet through the orifice is controlled to regulate the amount of heat introduced into the pellet.

2 Claims, 6 Drawing Sheets

(56) References Cited

U.S. PATENT DOCUMENTS

| | | | | |
|---|---|---|---|---|
| 6,030,203 | A * | 2/2000 | Kuroda | B29C 45/54 425/561 |
| 6,135,196 | A * | 10/2000 | Kono | B22D 17/007 164/113 |
| 6,267,580 | B1 * | 7/2001 | Leopold | B29O 45/18 425/547 |
| 6,276,434 | B1 * | 8/2001 | Kono | B22D 17/007 164/312 |
| 6,283,197 | B1 * | 9/2001 | Kono | B22D 17/007 164/312 |
| 2001/0015272 | A1 * | 8/2001 | Kono | B22D 17/30 164/113 |
| 2002/0020943 | A1 * | 2/2002 | Leopold | B29C 45/53 264/328.14 |
| 2003/0066620 | A1 * | 4/2003 | Kono | B22D 17/007 164/113 |
| 2012/0034306 | A1 * | 2/2012 | Pollock | A61P 25/04 424/486 |

* cited by examiner

MICRO MOULDING MACHINE AND PROCESS

CROSS REFERENCE TO RELATED CASES

This application claims the benefit of U.S. Provisional Application 62/545,567 filed Aug. 15, 2017 entitled Micro Moulding Machine and Process.

BACKGROUND OF THE INVENTION

In the conventional plastic moulding process, plastic pellets are put into the hopper of a screw extruder that grinds and melts the plastic. Once the plastic material is up to the injection temperature it is injected by screw rotation and translation of the screw thereby injecting the molten plastic into a mould. Typically, the mould is quite hot. Once filled and cooled, the mould is opened and the now injection moulded part removed. In this prior art process the sprue, gates, flashing and defective parts are recycled by regrinding and returning them to the hopper to be re-moulded to reduce waste and therefor lower the cost of the part.

Medical plastics are very expensive per pound and may not be reground or reused beyond one heat signature. Overheated and reheated medical plastic can breakdown chemically and become toxic in medical applications. Although conventional moulding technology is capable of making medical device parts, it is not able to meet the need to form inexpensive and non-toxic parts from medical plastic. Therefore, there is a need to improve upon the prior art moulding techniques.

SUMMARY OF THE INVENTION

In contrast to the prior art, the system of the present invention begins with a precision preformed plastic pellet that is essentially equal in volume to the volume of the completed part. That is, the amount of plastic in the pellet that is to be injected, is equal to the capacity of the mould cavity. Essentially, all the plastic is displaced into the final moulded part.

Heating the single pellet is done in two stages. The preformed pellet is inserted into a nozzle and undergoes a first conductive heating process for a period of time "T" while stationary. The pellet is in intimate contact with the injector pin cavity within the nozzle. Temperature controlled electric heaters supply heat by conduction into the pellet that softens it. Next the softened pellet is quickly rammed through a small orifice where the power required to push the pellet through the hole is converted into heat in the pellet. This is the second heating step and it occurs over a time "t" shorter than the initial heating time T. The orifice is very near the mould gate and the second stage heating process both heats the plastic and fills the mould to capacity by displacing all the plastic from the injection nozzle cavity into the mould cavity.

BRIEF DESCRIPTION OF THE DRAWINGS

FIG. 2b is a cross section schematic view of a portion of an alternative embodiment of the complete machine shown in FIG. 2a.

FIG. 3b is a cross section schematic diagram of an alternative embodiment of the machine shown in FIG. 3a.

FIG. 4b is a cross section schematic diagram showing mechanical components of an alternative embodiment of the machine shown in FIG. 4a.

DETAILED DESCRIPTION

The Process of the Invention

Figure 1:
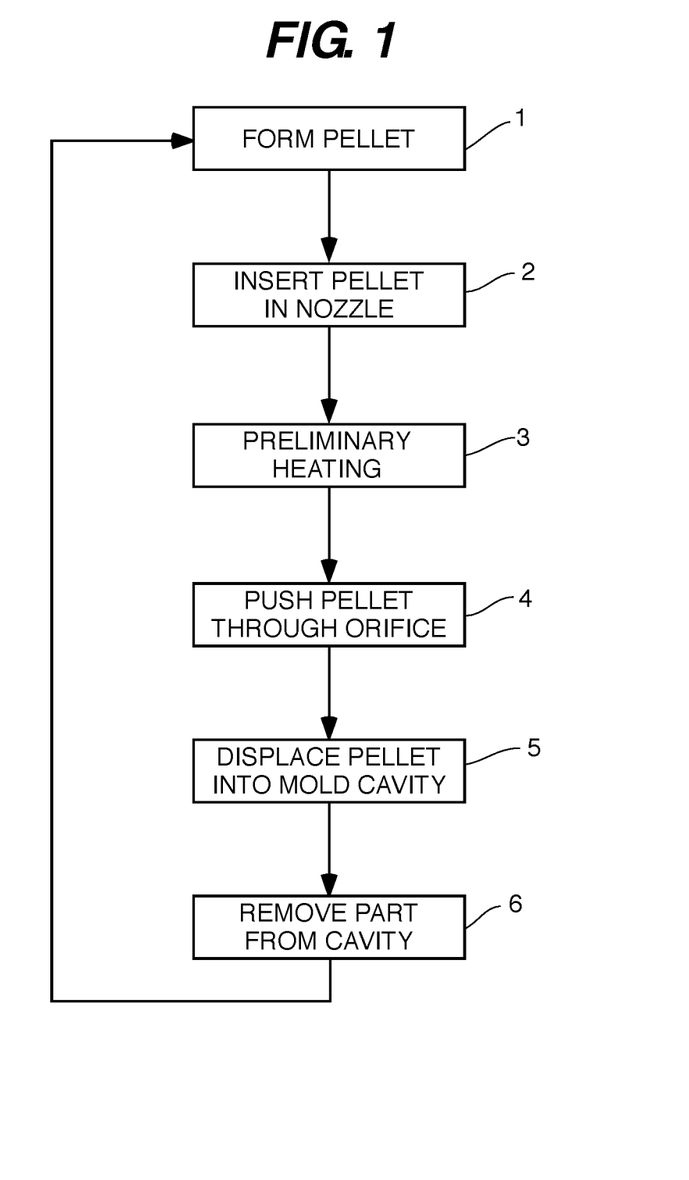
FIG. 1 is a flow diagram showing the process through one moulding cycle.

Overall the process is sequential and repeats as a cycle. FIG. 1 depicts this process with a flowchart. The steps 1-6 of the flow chart shown in FIG. 1 correspond to the sequence of pellet injection and mould formation shown in FIGS. 2-4 as well as the pellet formation process shown in FIG. 5.

Figure 5:
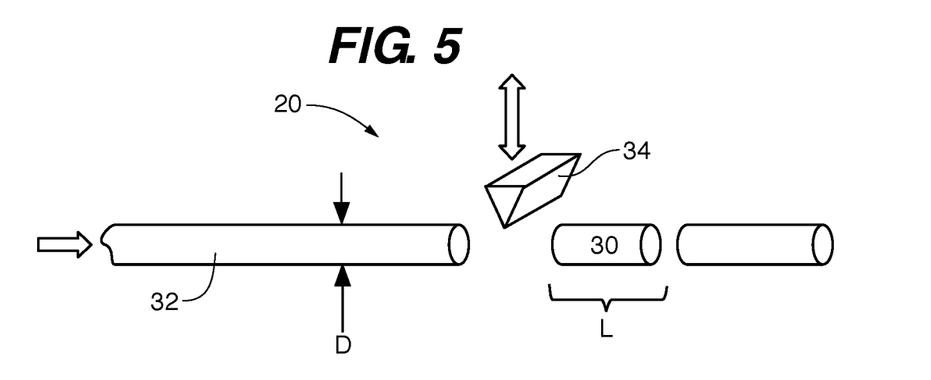
FIG. 5 is a perspective schematic drawing of the precision preform process.

The process may be considered to begin with the step 1 creation of a precise sized pellet 30 from a preform 20, which is shown in detail in FIG. 5.

FIG. 5 shows an illustrative process for forming a precision preform 20 in accordance with step 1 of the process shown in FIG. 1. As shown, typically, the plastic material will be provided in the form of preform 20 which is most commonly in the form of an extruded rod 32 from the manufacturer. Ideally the diameter of the raw material rod 32 matches the diameter of injection pin 42 (see FIGS. 2-4) having a diameter "D". A blade 34 or other implement is used to cutoff pieces of appropriate length "L" of raw material to define the desired volume "V" of material. This resulting pellet 30, will thus have the volume V corresponding to the volume of the mould cavity 18.

In some embodiments, the pellet 30 may be pre-moulded into the required cylindrical shape, length and volume.

Figure 2A:
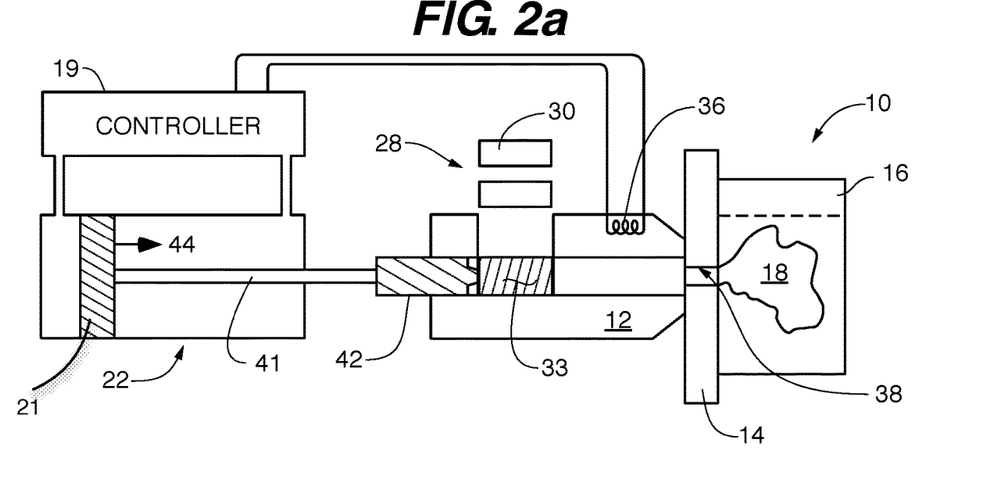
FIG. 2a is a cross section schematic view of a portion of the complete machine to show orientation of certain components.
Figure 2B:
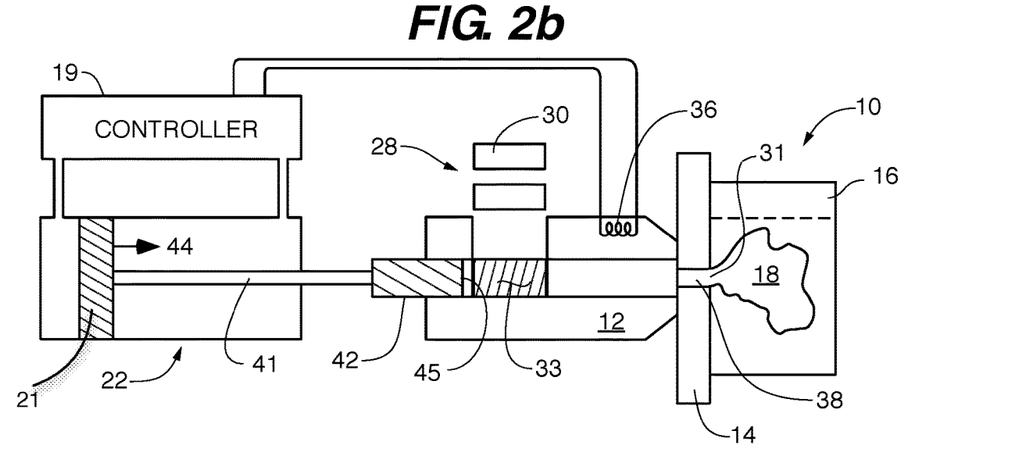
Figure 3A:
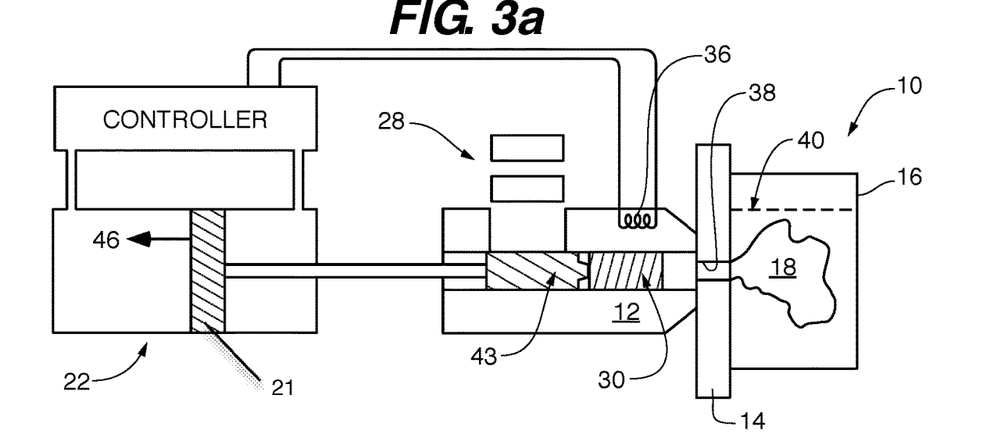
FIG. 3a is a cross section schematic diagram showing mechanical components of the machine.
Figure 3B:
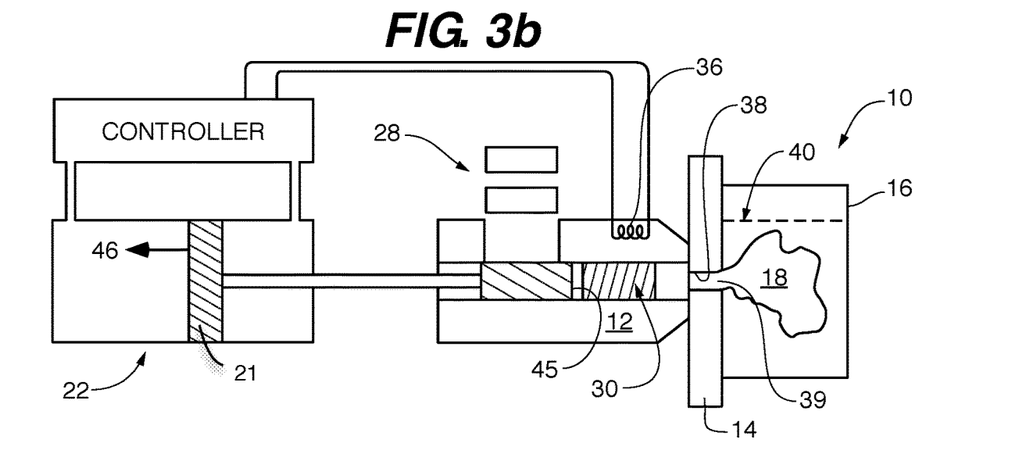
Figure 4A:
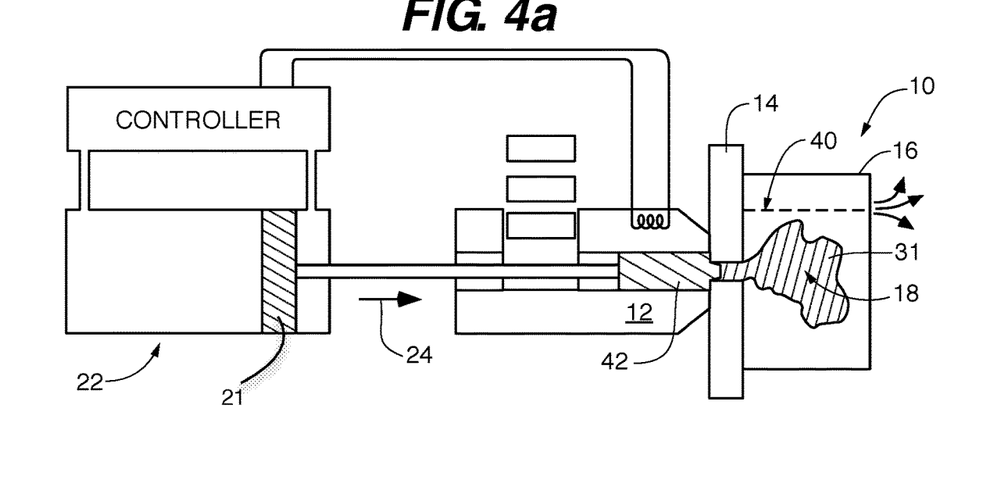
FIG. 4a is a cross section schematic diagram showing mechanical components of the machine.
Figure 4B:
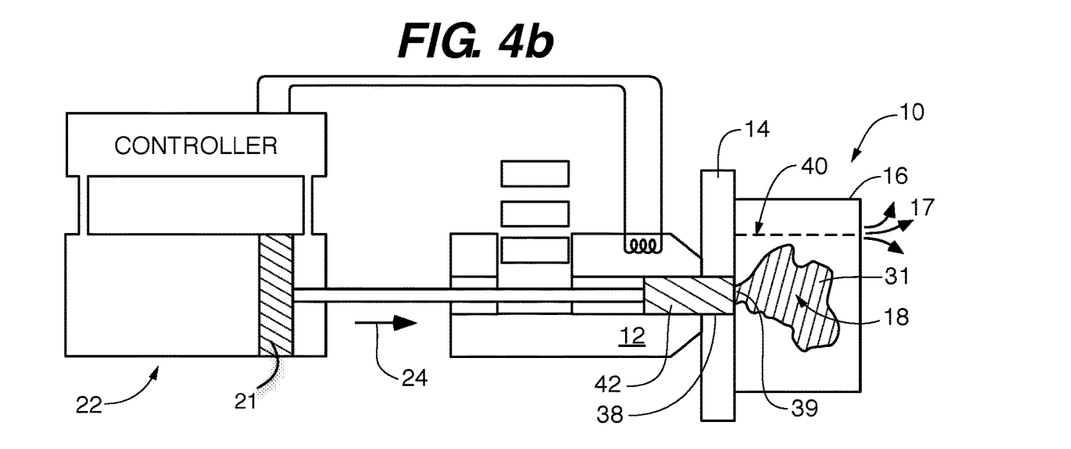

Next in step 2, as represented in FIG. 1, a single pellet 30 is inserted into the nozzle 12 of the desktop micro-moulding machine 10 shown in FIGS. 2-4. In practice, the single pellet 30 is pushed from a feed tray (representatively depicted as a multitude of pellets at element 28) into a cavity 32 of the nozzle 12. Typically, an automated material inject cylinder carries out this task although manual feed from a feed tray is an option as well.

Next in step 3, as represented in FIG. 1, preliminary pellet heating occurs first without any interaction with the injection pin 42. This preliminary heating step is shown in FIG. 3a and is discussed in greater detail below. This stage of heating may be carried out with one or more electric resistance heaters 36 under automated control for a suitable initial heating time T. In at least one embodiment, there are between two and four resistance heaters 36 providing heat to the nozzle 12.

In the next, step 4, as represented in FIG. 1, the cylindrical injection pin 42 is activated and the pre-heated pellet 30 is quickly pushed through the orifice 38 in the backer plate 14 such as in the manner shown in FIGS. 3-4. The power associated with rapid movement of the ram 42 is converted into heat within the plastic of the pellet 30. This high-speed, secondary, heating step occurs over time t, with the pneumatic power supplied being converted into heat.

In the next step 5, as represented in the flow chart of FIG. 1 and depicted directly in FIG. 4a, the now fully heated plastic pellet 30 (still visible in FIG. 3a) is displaced into the cavity 18 of the mould 16. The plastic of the pellet is now no longer a pellet but takes on the shape of the cavity 18 as defined by the mould 16, and that shape of plastic is represented by element 31 in FIG. 4a. The plastic is moved into the mould 16 with the pneumatic force supplied by the injection pin 42 and the molten plastic 31 is displaced into the "cold" mould forcing the air out of the mould.

Steps 4 and 5 occur essentially simultaneously. They are partitioned and illustrated in sequence as FIGS. 3 and 4 as an aid to the understanding of the system's function.

Once the plastic 31 is sufficiently cool, the resultant part is removed from the mould 16, as represented in step 6 of the flow-chart of FIG. 1.

The electrical nozzle heating system establishes a repeatable and stable temperature gradient along the nozzle, backer plate, and mould path. Typically the nozzle is the hottest element at temperature T with the backer plate a few degrees less based mostly on the amount of power exerted on the pellet to force it through the orifice. The mould is usually the coldest element in the path by intention. This process when repeated produces another part of essentially identical heat inputs. The plastic degradation is both slight and repeatable, a characteristic that is desirable for medical parts. The temperature differentials between the elements along the injection path are very well controlled and parts are made with great uniformity and reproducibility.

The Apparatus of the Invention

In furtherance of the description provided above the components of the embodiment shown in FIGS. 2a, 3a and 4a are discussed in more detail below. An alternative embodiment of the invention having some different component features is illustrated in FIGS. 2b, 3b and 4b.

Turning first to FIG. 2a, a schematic presentation of the desktop micro-moulding machine 10 is shown. A pneumatically driven piston 21 within a pneumatic cylinder or ram 22 can move in an advancing direction 44 or a retracing direction 46 under the control of the controller 19. The injection pin 42 is coupled to the air cylinder 22 by a connection rod 41. These same features are present in the embodiment shown in FIG. 2b.

In both embodiments, a pellet 30 has been loaded into the injector pin cavity that is an elongate cylindrical cavity 33 formed in the nozzle 12. The nozzle 12 carries an injection pin 42 that has a small diameter pintle nose 43 seen most clearly in FIG. 3a. In the embodiment shown in FIG. 3b, the injection pin 42 has a flat face or pellet engagement surface 45.

After the pellet 30 is loaded into the elongate cylindrical cavity as seen in FIGS. 2a and 2b, the controller 19 admits a controlled volume of air to advance (see arrow 44) the pellet 30 into the nozzle 12 and advance it into proximity to the heater 36, depicted in FIGS. 3a and 3b. At this location and while stationary, heat is applied via the heater 36 to soften the pellet 30. This is the first heating process and it occurs for a controlled period of time T.

Next, as shown in FIG. 4a, the injection pin 42 is advanced (see arrow 24) at high speed to ram the pellet 32 through the backer plate orifice 38 that is formed in the backer plate 14. In the embodiment shown in FIG. 4a, the orifice 38 has a diameter smaller than that of the nozzle cavity 31. The act of pushing the pre-heated and softened pellet 30 through the orifice 38 at high speed acts to heat the pellet 30 to the extent that the plastic of the pellet 30 is liquefied (see element 31) as it enters the mould cavity 18.

Alternatively, as shown in the embodiment of FIGS. 2b, 3b and 4b, the backer plate orifice 38 has a diameter substantially the same as that of the nozzle 12 and it is the diameter of the mould opening 39 which is smaller than that of the backer plate orifice 38 as and the nozzle 12. As a result, when the injection pin 42 pushes the pellet 30 into the mould interior 18, the pin 42 extends entirely through the backer plate 14 such as in the manner shown in FIG. 4b.

The last moments of the high speed injection are shown in FIGS. 4a and 4b, where the mould cavity 18 is filled with the liquefied plastic 31 of the former pellet 30, and air (represented by arrows 17) is escaping from the parting line 40 of the mould 16. A substantial amount of heat is quickly added to the plastic 31/pellet 30 by this step. The work preformed by the air cylinder 22 at this time is large and the friction associated with the dissipation of this work shows up as heating in the pellet 30. In this last phase, in the case of the embodiment shown in FIG. 4a, the pintle nose 43 moves beyond the nozzle boundary and is within the backer plate orifice 38. Most specifically the pintle 43 "fills" the backer plate orifice 38. This event serves to fully displace essentially all the pellet volume into the mould cavity 18 volume. Whereas, in the embodiment shown in FIG. 4b, the liquefied plastic 31 is pushed into the mould interior 18 by the pin 42 pushing the pellet entirely through the backer plate orifice 38.

In at least one instance the machine as shown in FIGS. 2b, 3b and 4b, may result in some excess of plastic material 31 not fully entering the mould interior 18. The "excess" material might extend through the mould opening 39 to form a handle or other small protrusion of which the moulded component may be grasped such as for inspection and assembly, and which if desired may be readily removed later in time.

Figure 7:
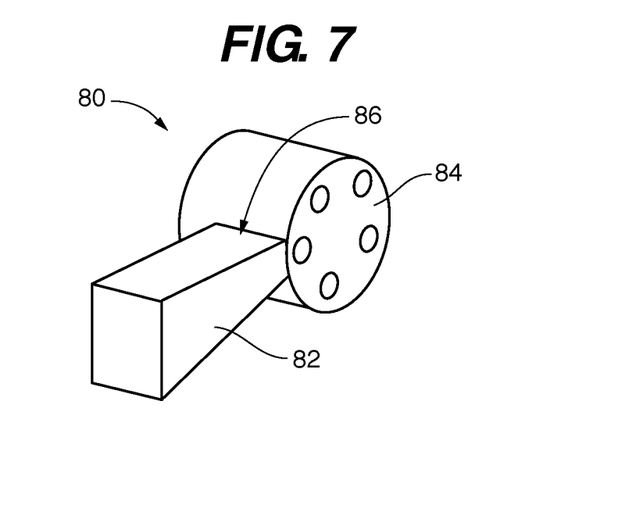
FIG. 7 is a perspective view of a small part made with an alternative embodiment of the invention.

An example of such a component is shown in FIG. 7, a small cylindrical component assembly 80, which has been moulded in accordance with the process described above, is shown with a handle region 82 attached to the primary body of the cylindrical component 84, which is in fact the intended component as defined by the mould interior 18. The handle region 82 is attached to the component 84 via a necked down region 86 of the assembly. Hereto, the entire pellet 30 has been displaced into the mould interior 18, but a portion of the resultant moulded part is used as a handle for manipulating the part, for inspection and assembly. Eventually this portion of the part is removed and discarded. The necked down region 86 in the mould 16 provided by the assembly 80 gives rise to the formation of a corresponding necked down region of the part which allows the handle aspect of the part to be easily removed therefrom.

The process of forming a moulded component such as is shown in FIG. 7 (or any other type of configuration of component) may be repeated after the mould is opened and the formed part removed. In general, the piston 21 will move into the retract direction 46 to uncover the loading port 41 in the nozzle 12 to begin the next formation cycle.

In summary, in the various embodiments shown and described, after a relatively long thermal heating interval T an injection pin enters the nozzle and pushes the softened plastic through a small aperture along the injection path into the mould, this injection phase has a very short duration t. The amount of work done and therefore the amount additional or secondary heat supplied to the pellet is directly proportional to this time interval t. The time interval may be controlled by the air pressure supplied to the air cylinder as well as the valve duration of the controller.

The mould 16 is down stream from the heater 36 and is relatively cool therefore when the hot plastic 31 is displaced into the cold mould it very quickly cools and solidifies. By displacing essentially 100% of the plastic into a mould cavity there is no waste. Adding heat quickly along the path by forcing the plastic through the orifice into the cold mould very little time is spent at high temperature reducing chemical degradation of the plastic.

Typically, there will be a two-piece mould 16 with a parting line 40 of conventional design and contrition. However, the coldness of the mould allows the mould to be made with clearances that allow quick expulsion of air 17 from the mould by the plastic 31 without the creation of flash along the parting lines of the mould as seen at reference numeral 17 and described above.

The mould 16 itself butts up against a backer plate 14, which is in turn in contact with the nozzle 12. Placing the backer plate and nozzle in contact with each other causes the mould to warm above ambient temperature. However the tight control of nozzle temperature means that there is a tightly controlled temperature profile between these components and the mould is relatively "cold" and the temperature difference between the nozzle and the mould proper is very stable. In essence, the controlled heating within the nozzle establishes a very reproducible temperature gradient between the nozzle, pintle plate and mould structures. Although well above ambient temperature the mould is downstream thermally and is therefore "cold" by comparison.

The "cold" mould eliminates flash on the part even though the mould parting line is quite leaky to air. The plastic when it reaches the parting line of the mould "freezes" sealing the mould cavity. As described above the and during injection the injection pin pintle enters the backer plate displacing essentially 100% of the heated plastic into the mould. After a short cooling time the mould is opened and the injection moulded part is ejected. The process then repeats to create the next part.

Figure 8:
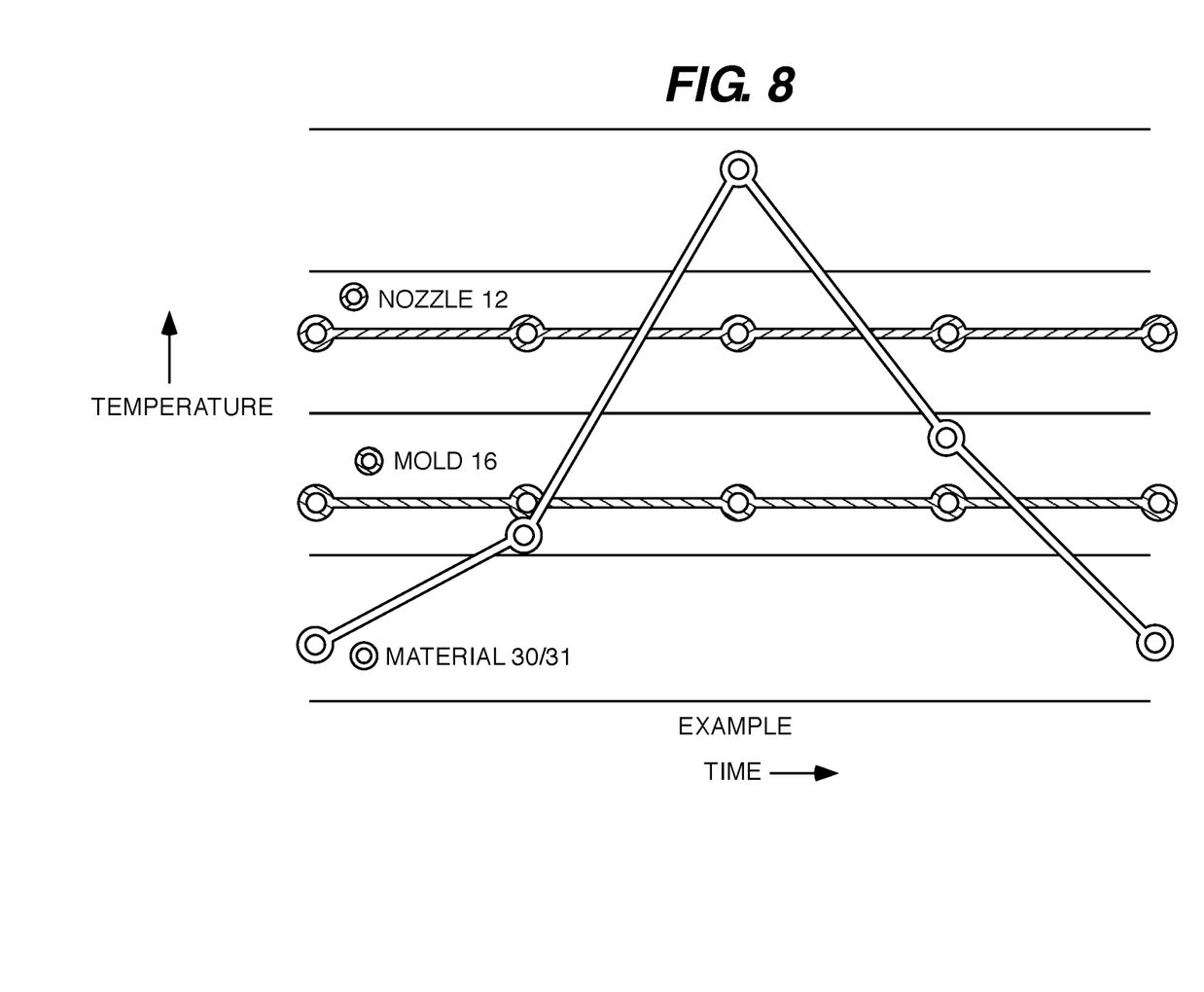
FIG. 8 is a graph showing the temperature of relevant components of the embodiment shown in FIGS. 2-4 during the moulding process.

A representative graph of the relative temperatures of the relevant components as well as the changes which occur to the pellet/material as the moulding process occurs is illustrated in FIG. 8.

Figure 6:
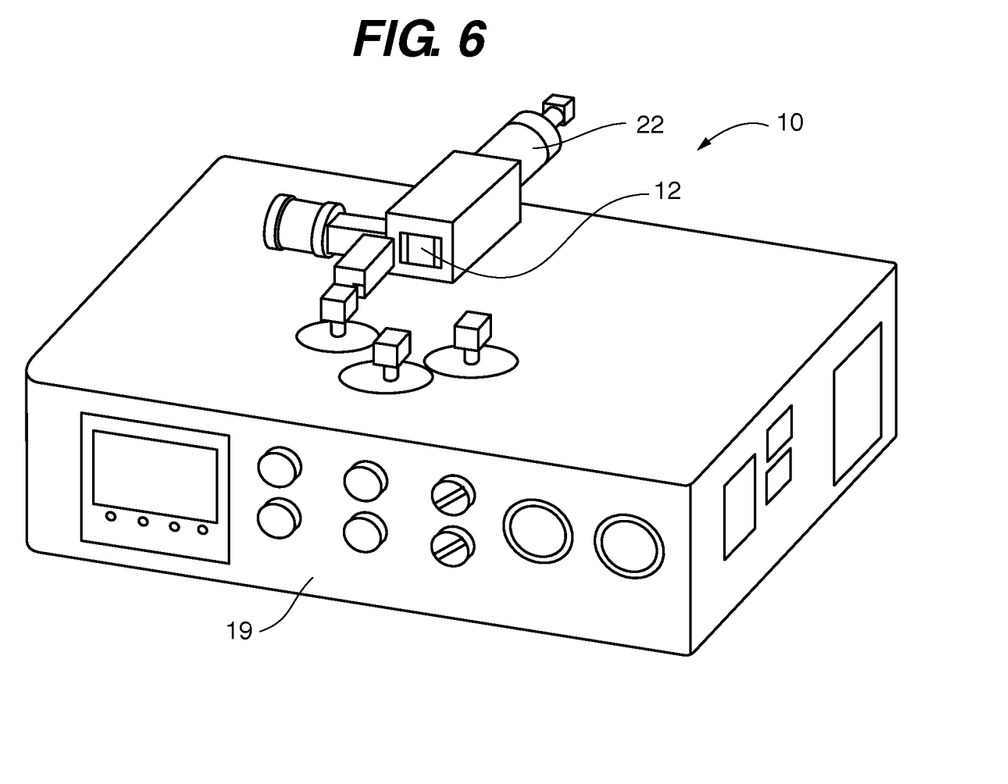
FIG. 6 is a perspective view of an exemplary implementation of the apparatus for carrying out the process.

FIG. 6 shows a perspective view of a prototype apparatus for carrying out the method. The mould and backer plate are removed in the view showing the nozzle 12 and the diameter D of the injection pin cavity. The controller 19 and related hardware are in the base supporting the pneumatic cylinder 22.

What is claimed is:

1. A moulding machine comprising;
   an injection nozzle containing an elongate cylindrical cavity defining a nozzle injection path and having a diameter;
   a cylindrical injection pin having a diameter matching said cylindrical cavity, a cylindrical pintle located at a distal end of said injection pin adapted to translate along said nozzle injection path;
   a material loader for placing a cylindrical pellet into said nozzle injection path; forming a loaded pellet; said loaded pellet having a cylindrical shape and a fixed volume, said cylindrical pellet in contact with said cylindrical cavity;
   a set of nozzle heaters connected to said nozzle for supplying heat to said injection nozzle;
   a backer plate coupled to said injection nozzle, said backer plate having a backer plate orifice aligned with said nozzle injection path, the backer plate orifice has a diameter smaller than that of the nozzle injection path;
   a mould positioned immediately adjacent to said backer plate, said mould defining a mould cavity equal in volume to said cylindrical pellet, said mould having an opening aligned with said backer plate orifice, said opening being smaller in diameter than the diameter of the cylindrical cavity, said opening forming a mould injection path, such that mechanical motion of said pellet though said opening adds heat to said pellet thereby liquefying said pellet, forming a liquefied pellet, the cylindrical pintle adapted to enter said backer plate orifice at the end of an injection stroke, thereby completely displacing the pellet into said mould cavity;
   said backer plate in thermal contact with nozzle and said nozzle in thermal contact with said mould establishing a thermal gradient along said injection paths resulting in said mould being cooler than said nozzle;
   a pneumatic ram adapted to provide power and mechanical motion to said injector pin to drive the injector pin along said injection path, whereby pneumatic pressure supplied to said ram determines the amount of heat supplied to said pellet by said backer plate orifice.

2. The machine of claim 1, wherein the cylindrical injection pin defines a flat pellet engagement surface.

* * * * *